United States Patent
Jennen

(10) Patent No.: US 7,421,204 B2
(45) Date of Patent: Sep. 2, 2008

(54) METHOD AND SYSTEM FOR INCREASING THE SPECTRAL EFFICIENCY OF BINARY CODED DIGITAL SIGNALS

(75) Inventor: Jean Gerardus Leonardus Jennen, Hilversum (NL)

(73) Assignee: Lucent Technologies Inc., Murray Hill, NJ (US)

( * ) Notice: Subject to any disclaimer, the term of this patent is extended or adjusted under 35 U.S.C. 154(b) by 561 days.

(21) Appl. No.: 10/934,610

(22) Filed: Sep. 2, 2004

(65) Prior Publication Data
US 2006/0045539 A1   Mar. 2, 2006

(51) Int. Cl.
*H04J 14/00* (2006.01)
(52) U.S. Cl. .............................. 398/77; 398/76; 398/189
(58) Field of Classification Search .................... 398/76, 398/77, 78, 186–190
See application file for complete search history.

(56) References Cited

U.S. PATENT DOCUMENTS

| 6,694,104 | B1 | 2/2004 | Caplan et al. | |
|---|---|---|---|---|
| 7,146,103 | B2 * | 12/2006 | Yee et al. | 398/68 |
| 2002/0030807 | A1 * | 3/2002 | Way et al. | 359/183 |
| 2003/0007216 | A1 * | 1/2003 | Chraplyvy et al. | 359/161 |
| 2003/0189745 | A1 | 10/2003 | Nobuhiko et al. | |
| 2004/0141222 | A1 * | 7/2004 | Miyazaki et al. | 359/237 |
| 2005/0265406 | A1 * | 12/2005 | Kaertner et al. | 372/30 |
| 2006/0056535 | A1 * | 3/2006 | Zschunke et al. | 375/281 |

FOREIGN PATENT DOCUMENTS

| EP | 05 25 5354 | 12/2005 |
|---|---|---|
| WO | WO 02/13432 A | 2/2002 |

OTHER PUBLICATIONS

Ikegami T et al: "A study of constant envelope CDMA system for multimedia satellite communication" Spread Spectrum Techniques and Applications, 1998. Proceedings., 1998 IEEE 5th International Symposium on Sun City South Africa Sep. 2-4, 1998, New York, NY, USA, IEEE, US, vol. 3, Sep. 2, 1998.
W. Idler, "Advantages of Frequency Shift Keying In 10 Gb/s Systems" 2004 IEEE/LEOS Workshop on Advanced Modulation Formats, San Francisco, CA, Jul. 1-2, 2004.

* cited by examiner

*Primary Examiner*—Dzung D Tran

(57) ABSTRACT

A method and system for increasing the spectral efficiency of binary coded signals includes encoding an input binary bit sequence such that the input binary bit sequence is converted into a series of rectangular pulses having varying repetition rates. A continuous wave carrier signal is then modulated via a control signal representative of the encoded signal. The modulated optical signal is filtered by a narrow band optical filter to generate a minimum shift keying (MSK) encoded optical signal. In accordance with the present invention, an input binary bit sequence is encoded via a minimum shift keying (MSK) modulation format to improve the spectral efficiency of a binary coded digital signal and to contemporaneously limit distortion of the optical signal induced by optical nonlinear effects during transmission in an optical transmission system.

19 Claims, 5 Drawing Sheets

FIG. 3

$T_b = 1/r_b$
$f_{CLI} = f_{CLQ} = r_b/2$
$f_H = r_b$
$f_L = r_b/2$

METHOD AND SYSTEM FOR INCREASING THE SPECTRAL EFFICIENCY OF BINARY CODED DIGITAL SIGNALS

FIELD OF THE INVENTION

This invention relates to the field of communications systems and, more specifically, to a method and system for improving the spectral efficiency of a binary coded digital signal for optical transmission.

BACKGROUND OF THE INVENTION

To meet today's demand for high-speed cost-effective communications, optical transmission systems having increased data capacity are highly desirable. One approach used in modern high-capacity transmission systems to increase the aggregate data-rate of transmission systems is to use a technique called dense wavelength division multiplexing (DWDM). In DWDM, an optical transmission link is divided into a plurality of channels with each channel having its own center frequency. Data transmitted on a particular channel is then affected by modulating the optical carrier at the center frequency of that channel. At the receiver, a bandpass filter tuned to the center frequency of the channel is used for detecting and demodulating the transmitted signal. By combining a plurality of channels in this manner, the aggregate data capacity of the optical link is increased. A limitation in increasing the aggregate data-handling capacity of DWDM optical transmission systems, however, is the amount of separation required between adjacent channels sufficient to reduce cross-channel interference to acceptable levels. Channel separations in the range of 50 GHz-100 GHz are commonly used to achieve sufficient separation.

However, the aggregate data rate presently achievable in conventional optical transmission systems is still orders of magnitude below the total capacity of optical fibers. In other words, the spectral efficiency (defined as the ratio between the aggregate bit rate transmitted over the optical link and the total optical bandwidth) of conventional transmission systems is not maximized for many reasons. First, the need to maintain channel separation of between 50-100 GHz to reduce interference between channels reduces the number of channels that can be multiplexed on the optical link. As a result, the aggregate bit rate of the optical link is limited thereby reducing the spectral efficiency of the transmission system. Also, because dispersion and nonlinearities in the optical transmission link limits the modulation bandwidth, and thus the bit-rate of any particular signal channel, the spectral efficiency of the system is decreased. As such, robust and cost efficient modulation formats for increasing spectral efficiency are of high interest for optical transmission systems.

For example, spectrally efficient signaling techniques, such as duobinary signaling, have been investigated in an attempt to reduce the spectral bandwidth required for each particular channel so that more channels can be supported by an optical link. In duobinary signaling, the required spectral bandwidth for a channel is reduced by manipulating the phase of the output data symbols transmitted over that channel. In duobinary, the data to be output consists of a combination of zeros and ones. In various duobinary signaling arrangements, the phase of the output data symbols are selected as follows: 1's in the input data stream that are separated by an even number of 0's have an identical phase in the duobinary signal output while 1's that are separated by an odd number of 0's have an opposite phase to that of the previously output 1. For example, the input data sequence $\{1, 1, 0, 1, 0, 0, 1, 1\}$ is converted to a duobinary signal output of $\{1, 1, 0, -1, 0, 0, -1, -1\}$ where $-1$ denotes a data bit having an opposite phase of a 1 data bit. Although duobinary signaling does increase the spectrally efficiency of the transmission system by narrowing the spectral bandwidth required for a channel, an improvement in bandwidth efficiency with duobinary signaling is limited to a factor of the square root of two (2) and there is no improvement in the tolerance of a signal to nonlinear effects caused by transmission of the signal along an optical path.

SUMMARY OF THE INVENTION

The present invention addresses various deficiencies of the prior art by providing a method and system for improving the spectral efficiency of a binary coded digital signal, while contemporaneously limiting distortion of the optical signal induced by optical nonlinear effects during transmission in an optical transmission system.

In one embodiment of the present invention, a method for improving the spectral efficiency of a binary coded digital signal includes encoding a received binary bit sequence indicative of a binary coded digital signal to convert said binary bit sequence into a series of rectangular pulses having varying repetition rates, modulating a continuous wave carrier signal via a control signal representative of the encoded signal, and performing single side band filtering of the modulated carrier signal to produce a resulting modulated carrier signal having a normalized frequency deviation about a central frequency of the resulting modulated carrier signal.

In an alternate embodiment of the present invention a system having increased spectral efficiency of transmitted binary coded signals includes at least one coding circuit for encoding an input binary bit sequence such that the input binary bit sequence is converted into a series of rectangular frequency pulses having varying repetition rates and for providing a control signal representative of the encoding, at least one continuous wave source for providing an optical carrier signal, at least one optical modulator for receiving the control signal and modulating the carrier signal according to the control signal, and at least one narrow band optical filter for filtering the modulated optical signal to produce a resulting modulated carrier signal having a normalized frequency deviation about a central frequency of the resulting modulated carrier signal.

BRIEF DESCRIPTION OF THE DRAWINGS

The teachings of the present invention can be readily understood by considering the following detailed description in conjunction with the accompanying drawings, in which:

FIG. 3 depicts a high level functional diagram of an embodiment of a coding and pulse shaping circuit suitable for use in the system of FIG. 2 and a corresponding graphical representation of an embodiment of MSK coding according to an embodiment of the present invention;

To facilitate understanding, identical reference numerals have been used, where possible, to designate identical elements that are common to the figures.

DETAILED DESCRIPTION OF THE INVENTION

The present invention advantageously provides a method and system for improving the spectral efficiency of a binary coded digital signal, while contemporaneously limiting distortion of the optical signal induced by optical nonlinear effects during transmission. Although various embodiments of the present invention are described herein with respect to dense wavelength division multiplexing (DWDM) transmission systems, the specific embodiments of the present invention should not be treated as limiting the scope of the invention. It will be appreciated by those skilled in the art and informed by the teachings of the present invention that the method and system of the present invention may be advantageously implemented in various other transmission systems, such as single channel transmission systems and the like.

Figure 1:
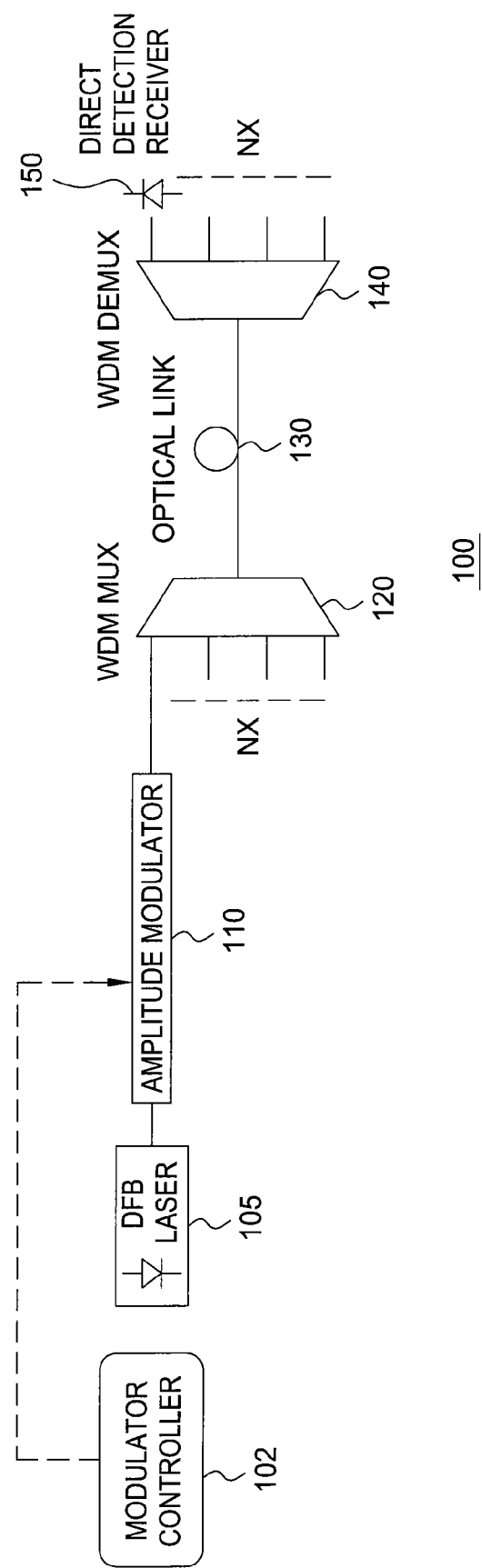
FIG. 1 depicts a high level block diagram of a conventional DWDM transmission system.

FIG. 1 depicts a high level block diagram of a conventional DWDM transmission system. The conventional DWDM transmission system 100 of FIG. 1 comprises a modulator controller 102, a distributed feedback (DFB) laser 105, an amplitude modulator 110, an N×1 wavelength division multiplexed (WDM) multiplexer 120, an optical link 130, a 1×N wavelength division multiplexed (WDM) demultiplexer 140, and N direct detection receivers 150.

In the DWDM transmission system 100 of FIG. 1, the DFB laser 105 is modulated via the amplitude modulator 110 using On/Off Keying (OOK) to produce a 10 Gbit/s data stream. Although FIG. 1 only depicts a single DFB laser 105 and modulator 110 combination, the WDM multiplexer 120 of FIG. 1 is capable of receiving N channels and thus is capable of receiving data from N DFB laser/modulator combinations. The modulated data is communicated to the WDM multiplexer 120 wherein the data is combined into a single WDM signal and communicated to the optical link 130. The optical link 130 of FIG. 1 may be as simple as a single segment of optical fiber or as complex as a submarine link with cascaded segments of fiber, booster, inline and pre-amplifiers, and regenerators. The signals from the optical link are communicated to the 1×N wavelength division multiplexed (WDM) demultiplexer 140, where the signals are separated into respective channels and communicated to respective direct detection receivers 150. As evident in the conventional system depicted in FIG. 1, the DWDM transmission system 100 implements a single detection means (i.e., via the direct detection receivers 150).

However, conventional transmission systems implementing amplitude modulation formats, such as the DWDM transmission system 100 of FIG. 1 implementing an OOK modulation format, suffer from many deficiencies limiting the capacity of such systems. For example, some of the major deficiencies limiting the capacity (i.e., the number of channels times the bit rate times the link distance) of conventional systems include adjacent channel cross talk, noise, chromatic dispersion, and non-linear effects such as self phase modulation. The present invention leads to a higher bandwidth capacity by using a modulation format with improved spectral efficiency (less cross talk, noise, and dispersion) and reduced amplitude modulation, which reduces non-linear effects.

Figure 2:
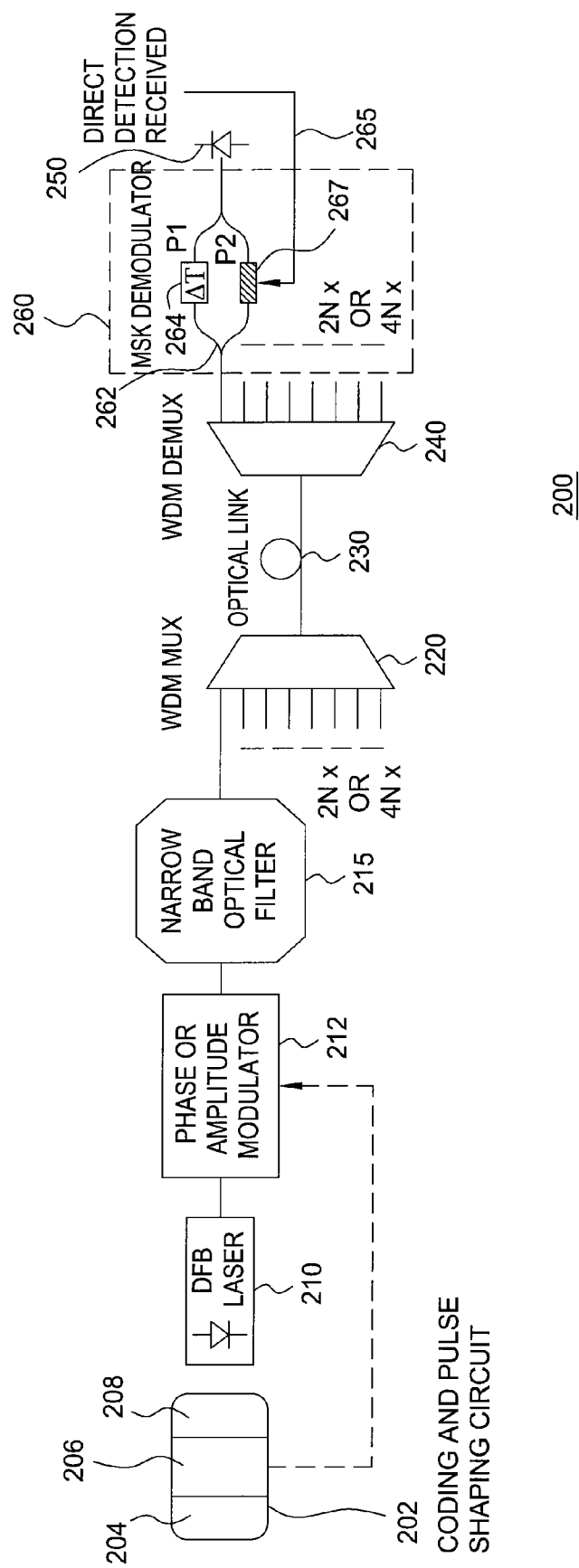
FIG. 2 depicts a high level block diagram of a DWDM transmission system in accordance with an embodiment of the present invention.

For example, FIG. 2 depicts a high level block diagram of a DWDM transmission system in accordance with an embodiment of the present invention. The DWDM transmission system 200 of FIG. 2 comprises illustratively 2N optical channels (as compared with N optical channels in the conventional DWDM transmission system 100 of FIG. 1). For ease of illustration and explanation, however, only the components in a first of the 2N channels are illustrated in the DWDM transmission system 200 of FIG. 2. As such, the description and function of the components first of the 2N channels described below, should be considered representative of each of the channels. The illustrated first channel of the DWDM transmission system 200 of FIG. 2 illustratively comprises a coding and pulse shaping circuit 202, a continuous wave source (illustratively a distributed feedback laser (DFB)) 210, an optical modulator 212, a narrow band optical filter 215, a 2N×1 wavelength division multiplexed (WDM) multiplexer 220, an optical link 230, a 1×2N wavelength division multiplexed (WDM) demultiplexer 240, a minimum shift keying (MSK) demodulator 260, and a direct detection receiver (illustratively a photodiode) 250.

The coding and pulse shaping circuit 202 of the DWDM transmission system 200 of FIG. 2 illustratively comprises a differential encoder 204, a converter 206 to generate antipodal quadrature signals, and a selector 208 to provide a control signal for the optical modulator 212.

The MSK demodulator 260 of the DWDM transmission system 200 of FIG. 2 illustratively comprises a Mach-Zehnder Interferometer (MZI) 262 comprising two optical paths P1 and P2. One of the optical paths of the MZI 262 (illustratively optical path P1) comprises an optical delay device 264 while another of the optical paths of the MZI 262 (illustratively optical path P2) comprises a phase shifter 267. The output of the MZI 262 of the MSK demodulator 260 is communicated to the receiver 250.

The MSK demodulator 260 further comprises a feedback path 265 to accomplish phase locking between optical paths P1 and P2 with respect to a resulting center frequency of the SSB filtered optical signal (described in greater detail below). In the MSK demodulator 260 of FIG. 2, the feedback path 265 includes the adjustable phase shifter 267, illustratively in the second path P2. The phase locking of the feedback path 265 is accomplished by feeding back a portion of the output of the receiver 250 to the adjustable optical phase shifter 267 to cause the adjustable optical phase shifter 267 to adjust the phase of the optical signal in the second path P2. Although in the MSK demodulator 260 of FIG. 2 a single optical delay device in only one of the optical paths, illustratively path P1 of the MZI 262, is depicted, it will be appreciated by those skilled in the art and informed by the teachings of the present invention that in a DWDM transmission system of the present invention, each optical path may comprise none, one or a plurality of optical delay devices or any combination thereof in accordance with the present invention. Similarly, although in the MSK demodulator 260 of FIG. 2 a single optical phase shifting device in only one of the optical paths, illustratively path P2 of the MZI 262, is depicted, it will be appreciated by those skilled in the art informed by the teachings of the present invention that in a DWDM transmission system of the present invention, each optical path may comprise none, one or a plurality of phase shifting devices or any combination thereof in accordance with the present invention.

Figure 3:
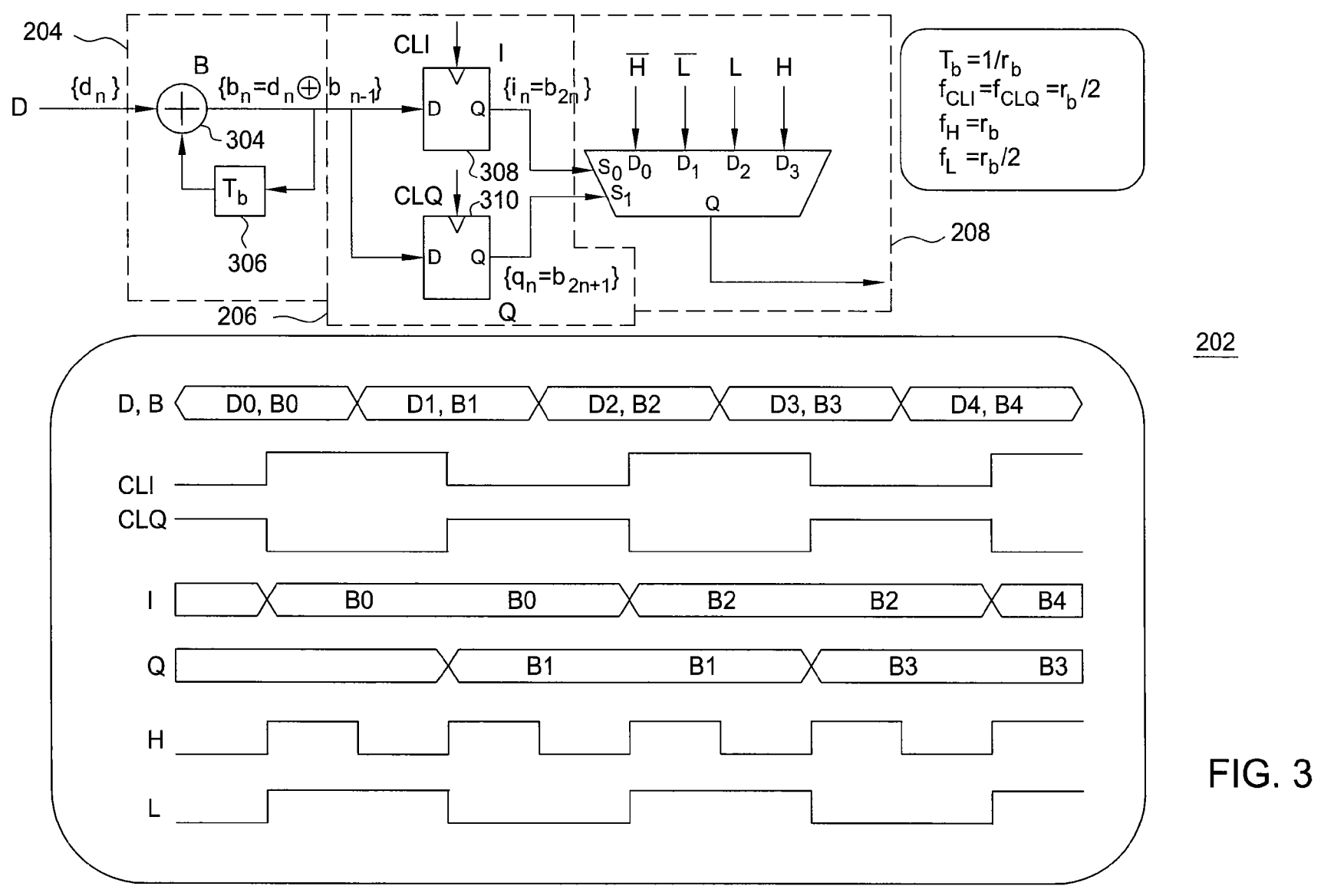

In the DWDM transmission system 200 of FIG. 2, input data in the form of a binary coded digital signal is encoded by the coding and pulse shaping circuit 202 such that the binary bit sequence is converted to a series of rectangular pulses with varying repetition rates. More specifically, FIG. 3 depicts a high level functional diagram of an embodiment of a coding and pulse shaping circuit suitable for use in the system of FIG. 2 and a corresponding graphical representation of an embodiment of MSK coding according to an embodiment of the present invention. A principle of the coding of the present invention is based on the modulation of the electrical field of the DFB laser 210 using either phase modulation or amplitude modulation.

In the coding and pulse shaping circuit 202 as depicted in FIG. 3, an input binary coded digital signal is received by the differential encoder 204. Illustratively, the differential encoder comprises a modulo-2 adder 304 and a single bit delay 306 such that the encoder output sequence equals the logical exclusive OR of the current input sequence and the single bit delayed output sequence. The data signal from the differential encoder 204 is communicated to the converter 206 to generate antipodal quadrature signals of the received data. Illustratively the converter 206 comprises two data flip-flops 308 and 310 each receiving the differentially encoded signal at their data inputs. Two complementary clock signals at half the bit rate (CLI and CLQ) are used to sample the even (I) and odd (Q) bits of the differentially encoded signal. The generated antipodal quadrature signals are communicated to the selector 208 and the selector 208 provides a control signal to the optical modulator 212. As depicted in FIG. 3, the input data binary bit sequence is converted to a series of rectangular pulses with varying repetition rates. In the coding of the present invention, the data signal, D, is converted into antipodal quadrature signals, I and Q, to ensure phase continuity.

The control signal from the coding and pulse shaping circuit 202 is communicated to the optical modulator 212 for causing the modulator to modulate the encoded input data, as described above, onto a carrier signal of the DFB laser 210. In accordance with the present invention, the carrier signal of the DFB laser 210 may be phase modulated or amplitude modulated. For example, the electrical field of the DFB laser 210 phase modulated in accordance with an embodiment of the present invention may be characterized according to Equations one (1) and two (2), which follow:

$$E_{MSK}(t) = A \frac{4}{\pi} \left( \sum_{k=0}^{\infty} (-1)^k \frac{1}{2k+1} \cos\{(2k+1)\pi r_b t\} \right) \cos(\omega_o t + \Theta) \quad (1)$$

$$E_{MSK}(t) = A \frac{4}{\pi} \left( \sum_{k=0}^{\infty} (-1)^k \frac{1}{2k+1} \cos\{2(2k+1)\pi r_b t\} \right) \cos(\omega_o t + \Theta) \quad (2)$$

Similarly, the electrical field of the DFB laser 210 amplitude modulated in accordance with the present invention may be characterized according to Equations three (3) and eight (4), which follow:

$$E_{MSK}(t) = A \left[ \frac{1}{2} + \frac{2}{\pi} \left( \sum_{k=0}^{\infty} (-1)^k \frac{1}{2k+1} \cos\{(2k+1)\pi r_b t\} \right) \right] \cos(\omega_o t + \Theta) \quad (3)$$

$$E_{MSK}(t) = A \left[ \frac{1}{2} + \frac{2}{\pi} \left( \sum_{k=0}^{\infty} (-1)^k \frac{1}{2k+1} \cos\{2(2k+1)\pi r_b t\} \right) \right] \cos(\omega_o t + \Theta) \quad (4)$$

In equations 1-4 above, $E_{MSK}(t)$ denotes the electric field of the DFB laser 210 after modulation, where A depicts the field amplitude of the optical signal prior to modulation, $\omega_o$ denotes the frequency of the signal from the DFB laser 210, $r_b=1/T_b$ depict the data bitrate, and $\Theta$ is an arbitrary phase offset equally distributed over the interval $[0, 2\pi]$. Specifically, equations (1) and (3), above, depict the electric field of a modulated optical signal when a logical low (L, $d_n=0$) modulation signal (code) is used, while equations (2) and (4) depict the electric field of a modulated optical signal when a logical high (H, $d_n=1$) modulation signal (code) is used. In equations 1-4 above, the logical levels of L and H correspond to a logic zero (0) and a logic one (1), respectively, for amplitude modulation, and to 0 and $\pi$ for phase modulation, however it will be appreciated by those skilled in the art that, inversely, the logical levels attributed to L and H may be reversed. More specifically, application of an equal phase shift to L and H simultaneously with respect to the signals depicted in FIG. 3 would result in the same behavior of the total embodiment in accordance with the present invention. In addition, it will be appreciated by those skilled in the art that the signals L and H, and their logical complements, at the data inputs ($D_0$-$D_3$) of the selector 208 may be interchanged. In such an embodiment, it would have to be taken into account that the output data would be inverse.

The modulated optical signal is communicated to the narrow band optical filter 215. The narrow band optical filter 215 of the DWDM transmission system 200 performs single side band (SSB) filtering of the modulated optical signal such that the converted rectangular frequency pulses have a normalized frequency deviation about a central wavelength of said filtered, modulated optical carrier. In accordance with the present invention, the SSB filtering may take place on either side (i.e., the right side or the left side) of the converted rectangular optical pulses. The SSB filtering of the present invention is implemented to generate a Minimum Shift Keying (MSK) modulated optical signal.

More specifically, in the DWDM transmission system 200 in accordance with an embodiment of the present invention, to improve the spectral efficiency, a frequency shift keying (FSK) modulation format is implemented by the coding and pulse shaping circuit 202 to modulate data onto the carrier signal of the DFB laser 210. That is, carrier signals from the DFB laser 210 are encoded such that a binary bit sequence is converted to a series of rectangular frequency pulses with a normalized frequency deviation about a central frequency equal to the bitrate of the binary bit sequence. For example, in one embodiment of the present invention, a binary bit sequence is converted to a series of rectangular frequency pulses with a normalized frequency deviation of 0.5 with respect to the bitrate. That is, defining $f_0$ as the central frequency, a logical one is represented by $f_0+0.25$ times the bitrate and a logical zero is represented by $f_0-0.25$ times the bitrate.

Subsequently, MSK is obtained by shaping the transmitted frequency pulses with a narrow band filter, such as the narrow band optical filter 215 of FIG. 2. Depending on the selected channel spacing, in alternate embodiments of the present invention, the function of the narrow band optical filter 215 may be included within the WDM multiplexer 220. That is, the WDM multiplexer 220 may function to filter the modulated optical pulses as described above using the narrow band filter 215.

The advantage of the MSK coding of the present invention is its superior spectral efficiency over other currently utilized modulation formats. MSK coding allows for tight channel spacing and at least double or even quadruple transmission capacity may be achieved in a transmission system in accordance with the present invention, such as the DWDM transmission system 200 of FIG. 2, over conventional transmission systems, such as the conventional DWDM transmission system 100 of FIG. 1.

After the SSB filtering of the present invention using, for example said narrow band optical filter 215 of the DWDM transmission system 200 on a leading edge of the rectangular optical pulses, the remaining optical frequencies are described by, in one embodiment, $\omega_o+\pi r_b$ and $\omega_o+2\pi r_b$. In an alternate embodiment of the present invention, the other side of the rectangular optical pulses may be filtered (i.e., the trailing edge of the rectangular optical pulses) by the narrow band optical filter 215 and as such, the remaining optical frequencies may be characterized as $\omega_o - \pi r_b$ and $\omega_o - 2\pi r_b$. In the latter embodiment, the output of the DWDM transmission system 200 of FIG. 2 must be manipulated to account for the fact that the trailing edge of the rectangular pulses was filtered. The electrical field of the filtered, modulated optical signals may be characterized according to the following equations five (5) and six (6) for the cases of phase modulation and amplitude modulation, respectively:

$$E_{SSB}(t) = A \frac{2}{\pi} \cos(\omega_o t + \pi r_b t + (i_n \oplus q_n)\pi r_b t + \overline{q_n}\pi + \Theta) \quad (5)$$

$$E_{SSB}(t) = A \frac{1}{\pi} \cos(\omega_o t + \pi r_b t + (i_n \oplus q_n)\pi r_b t + \overline{q_n}\pi + \Theta). \quad (6)$$

In equations (5) and (6) above, $i_n$ and $q_n$ depict the quadrature information symbols taking values 0 and 1 with equal probability.

The MSK signals from the narrow band optical filters 215 in each of the 2N channels of the DWDM transmission system 200 of FIG. 2 are communicated to the WDM multiplexer 220. The MSK signals are combined into a single DWDM signal by the WDM multiplexer 220 and communicated to the optical link 230. The multiplexed MSK signals propagate along the optical link and are communicated to the wavelength division multiplexed (WDM) demultiplexer 240, where the MSK signals are separated into respective channels and communicated to respective direct detection receivers 250. Again, although only a direct detection receiver 250 of a first channel of the DWDM transmission system 200 of FIG. 2 is depicted, the DWDM transmission system 200 of FIG. 2 may comprise at least one respective direct detection receiver for each of the channels. In addition, although the DWDM transmission system 200 of FIG. 2 is described as having 2N channels, a DWDM transmission system in accordance with the present invention may comprise up to 4N channels as compared to a conventional DWDM transmission system, such as the DWDM transmission system 100 of FIG. 1, because of the improvements in the spectral efficiency of binary coded digital signal in a DWDM transmission system in accordance with the present invention as described herein. More specifically, the inventors noted at least a four times improvement in the spectral efficiency of a binary coded digital signal in a DWDM transmission system in accordance with the present invention as compared to a conventional DWDM transmission system implementing amplitude modulation formats.

Furthermore, although the DWDM transmission system 200 of FIG. 2 illustratively comprises a respective coding and pulse shaping circuit for each of the 2N channels, in an alternate embodiment of the present invention, a single coding and pulse shaping circuit may be implemented for an entire DWDM transmission system of the present invention. In such an embodiment of the present invention, the carrier signals of each of the 2N DFB lasers may be encoded using a single coding and pulse shaping circuit. Furthermore, in such an embodiment, the carrier signals of each of the 2N DFB lasers may be encoded slightly differently in order to distinguish between the various channels.

Referring back to FIG. 2, at the direct detection receiver(s) 250, MSK demodulation is performed by means of the MSK demodulator 260 via the MZI 262. The time difference between the two optical paths P1, P2 is defined as $\Delta T = T_b$. As previously described, feedback is required in the MSK demodulator 260 to ensure phase locking between optical paths P1 and P2 with respect to the center frequency. The receiver is able to receive the encoded signal via the Mach-Zehnder Interferometer (MZI) 262 with a Free Spectral Range (FSR) equal to the bitrate of the coded optical signal (i.e. a path difference the size of a single bit delay between the two MZI branches). For example, the electrical fields after the optical delay device 264 in path P1 and the adjustable optical phase shifter 267 in path P2 of the MZI 262 may be characterized according to the following equations seven (7) and eight (8), respectively:

$$E_{P1}(t) = \frac{\sqrt{2}}{2} A e^{j(\omega_c(t-T) + \theta(t-T) + \Theta)} \quad (7)$$

$$E_{P2}(t) = \frac{\sqrt{2}}{2} A e^{j(\omega_c t + \varphi + \theta(t) + \Theta)}, \quad (8)$$

where A depicts the field amplitude of the optical signal at the input of the MZI 262, $\omega_c$ depicts the center frequency of the filtered, modulated optical signal, $\theta(t)$ depicts the phase modulation corresponding to the transmitted data, $\Theta$ depicts an arbitrary phase offset equally distributed over the interval $[0, 2\pi]$, $T = T_b$ depicts the duration of a single bit, and $\varphi$ represents the phase change imposed by the adjustable optical phase shifter 267 in optical path P2. The phase in the optical path P2 is adjusted such that $$\omega_c T + \varphi = -\frac{\pi}{2} + 2n\pi,$$

where n is an arbitrary integer. As such, the optical power at the receiver 250, may be characterized according to equation nine (9), which follows:

$$P(t) \propto \left| \frac{\sqrt{2}}{2} E_{P1}(t) + \frac{\sqrt{2}}{2} E_{P2}(t) \right|^2 = A^2 \left[ \frac{1}{2} + \frac{1}{2} \sin(\theta(t) - \theta(t-T)) \right]. \quad (9)$$

Figure 4:
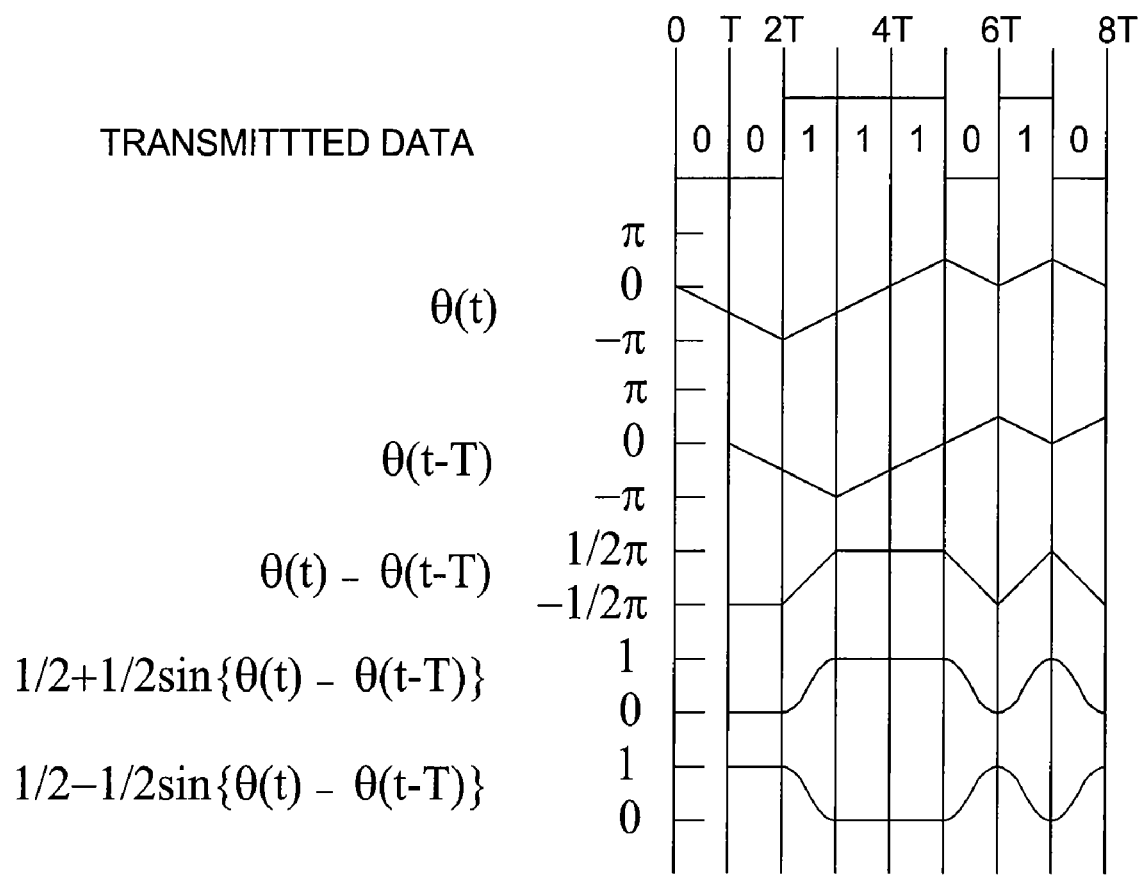
FIG. 4 depicts a graphical representation of an exemplary output of a receiver in accordance with an embodiment of the present invention.

FIG. 4 depicts a graphical representation of an exemplary output of a receiver in accordance with an embodiment of the present invention, such as the receiver 250 of the DWDM transmission system 200 of FIG. 2. In FIG. 4, eight input data bits are plotted in comparison with the various stages of an input binary coded digital signal including the coding stage, and the receiving stage. FIG. 4 illustrates that the transmitted data is clearly recognizable in the optical power domain, P(t), and as such, the data may be easily recovered using, for example, a discriminator.

Figure 5:
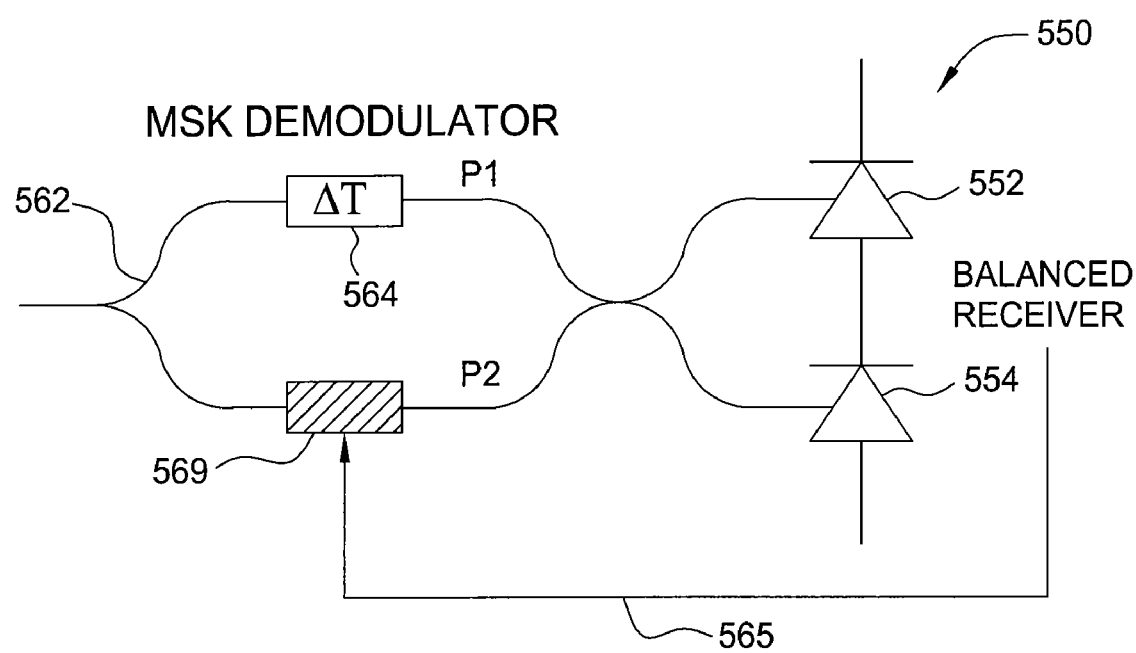
FIG. 5 depicts a high level block diagram of an MSK demodulator implementing balanced detection in accordance with an alternate embodiment of the present invention.

In an alternate embodiment of the present invention balanced detection is applied at the output of the MZI. The inventor determined that balanced detection offers up to 3 dB improvement in receiver sensitivity over the single-branch detection depicted in the DWDM transmission system 200 of FIG. 2, however, at the expense of a second photodiode. For example, FIG. 5 depicts a high level block diagram of an MSK demodulator 560 implementing balanced detection in accordance with an alternate embodiment the present invention. The MSK demodulator 560 of FIG. 5 illustratively comprises a Mach-Zehnder Interferometer (MZI) 562 comprising two optical paths P1 and P2. In the MSK demodulator 560, one of the optical paths of the MZI 562 (illustratively optical path P1) comprises an optical delay device 564. FIG. 5 further depicts a balanced receiver 550 including a first and second photodiode 552 and 554. The MSK demodulator 560 further comprises a feedback path 565 to accomplish phase locking. In the MSK demodulator 560 of FIG. 5, the feedback path 565 comprises an adjustable optical phase shifter 569 in the second path P2. The phase locking of the feedback path 565 is accomplished by feeding back a portion of the output of the balanced receiver 550 to adjust the phase of the optical signal in the second path P2.

In the balanced detection scheme of the embodiment of the present invention depicted in FIG. 5, the optical power detected by the second photodiode 554 may be characterized according to equation ten (10), which follows:

$$P\_(t) \propto \left| \frac{\sqrt{2}}{2} E_{P1}(t) - \frac{\sqrt{2}}{2} E_{P2}(t) \right|^2 = A^2 \left[ \frac{1}{2} - \frac{1}{2} \sin(\theta(t) - \theta(t-T)) \right] \quad (10)$$

In equation (10) above, the underscore in P_(t) reflects the fact that this power is complementary to P(t) because of the balanced detection. At the balanced receiver, P(t) and P_(t) are subtracted from each other leading to a signal with twice the amplitude as the case with single-ended detection described above, thus explaining the 3 dB advantage. It should be noted, however, that in alternate embodiments of the present invention, the phase in the second optical path P2 of the MZI 262 may be adjusted such that $$\omega_c T + \varphi = \frac{\pi}{2} + 2n\pi,$$

where n is an arbitrary integer. In such an embodiment, the output of the power signals P(t) and P_(t) would be reversed.

The implementation of the MSK pre-coding results in smaller bandwidth requirements per channel in a DWDM transmission system in accordance with the present invention due, at least in part, to the condensed spectrum of the MSK modulation format compared to conventional on/off keying (OOK). For example, with MSK 99% of the power is contained within a bandwidth of $1.2r_b$ whereas OOK requires $20.6r_b$ for the same 99% of the power. As such, the number of channels in a DWDM transmission system of the present invention may be doubled or even quadrupled compared to a conventional DWDM transmission system, such as the conventional DWDM transmission system 100 of FIG. 1. Furthermore, in a DWDM transmission system of the present invention, a power envelope of a modulated optical signal after ideal SSB filtering is constant. This eliminates distortion of the optical signal by optical non-linear effects, such as self phase modulation, during transmission as these effects occur due to amplitude variations.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for increasing the spectral efficiency of binary coded digital signals, comprising:
   encoding a binary bit sequence to convert said binary bit sequence into a series of rectangular pulses having varying repetition rates;
   modulating a continuous wave carrier signal via a control signal representative of said encoded binary bit sequence to produce a modulated carrier signal; and
   performing single side band filtering of said modulated carrier signal to produce a resulting modulated carrier signal having a normalized frequency deviation about a central frequency of the resulting modulated carrier signal.

2. The method of claim 1, further comprising:
   demodulating said resulting modulated carrier signal to recover therefrom said binary bit sequence.

3. The method of claim 2, where said resulting modulated carrier signal is demodulated via a Mach-Zehnder Interferometer comprising two optical paths, wherein a first of said two optical paths includes an optical delay device and a second of said two optical paths includes an adjustable phase shifter.

4. The method of claim 1, wherein said resulting modulated carrier signal comprises a minimum shift keying (MSK) modulation format.

5. A transmission system having increased spectral efficiency of transmitted binary coded signals, comprising:
   at least one coding circuit for encoding a binary bit sequence to convert said binary bit sequence into a series of rectangular pulses having varying repetition rates and for providing a control signal representative of said encoding;
   at least one continuous wave source for providing a continuous wave carrier signal;
   at least one optical modulator for receiving said control signal and modulating said a continuous wave carrier signal according to said control signal; and
   at least one narrow band optical filter for filtering said modulated carrier signal to produce a resulting modulated carrier signal having a normalized frequency deviation about a central frequency of the resulting modulated carrier signal.

6. The transmission system of claim 5, further comprising:
   at least one demodulator for demodulating said resulting modulated carrier signal.

7. The transmission system of claim 6, wherein said demodulator comprises a Mach-Zehnder Interferometer (MZI) and a feedback path.

8. The transmission system of claim 7, wherein said MZI comprises two optical paths, wherein a first of said two optical paths includes an optical delay device and a second of said two optical paths includes an adjustable phase shifter.

9. The transmission system of claim 8, wherein said transmission system further comprises a receiver for receiving said demodulated carrier signal.

10. The transmission system of claim 9, wherein at least a portion of an output of said receiver is fed back to said adjustable phase shifter via said feedback path to accomplish phase locking between said two optical paths of the MZI with respect to a center frequency of said resulting modulated carrier signal.

11. The transmission system of claim 9, wherein said receiver comprises a photodiode.

12. The transmission system of claim 9, wherein said receiver comprises a balanced detector.

13. The transmission system of claim 5, wherein said continuous wave source comprises a distributed feedback laser.

14. The transmission system of claim 5, wherein said narrow band optical filter performs single side band filtering.

15. The transmission system of claim 5, wherein said narrow band optical filter comprises a wavelength division multiplexed (WDM) multiplexer.

16. A wavelength division multiplexed (WDM) transmission system having increased spectral efficiency of transmitted binary coded signals, comprising:

a plurality of optical paths, each of said plurality of optical paths including:

at least one coding circuit for encoding a binary bit sequence to convert said binary bit sequence into a series of rectangular pulses having varying repetition rates and for providing a control signal representative of said encoding;

at least one continuous wave source for providing a continuous wave carrier signal;

at least one optical modulator for receiving said control signal and modulating said carrier signal according to said control signal; and at least one narrow band optical filter for filtering said modulated carrier signal to produce a resulting modulated carrier signal having a normalized frequency deviation about a central frequency of the resulting modulated carrier signal;

a WDM multiplexer for receiving a resulting modulated carrier signal from each of said plurality of optical paths and multiplexing them into a combined signal;

an optical link for propagating said combined signal;

a WDM demultiplexer for separating said combined signal into respective optical channels;

at least one demodulator for demodulating the demultiplexed optical channels; and at least one receiver for receiving said demodulated optical channels and recovering therefrom said input binary bit sequences.

17. The WDM transmission system of claim 16, wherein each of said plurality of optical paths comprises a respective demodulator and receiver.

18. The WDM transmission system of claim 16, wherein said resulting modulated carrier signals comprise a minimum shift keying (MSK) modulation format.

19. The WDM transmission system of claim 16, wherein said at least one continuous wave source comprises a distributed feedback laser.

* * * * *